United States Patent [19]

Koksbang

[11] Patent Number: 5,549,880
[45] Date of Patent: Aug. 27, 1996

[54] METHOD OF MAKING LITHIUM-VANADIUM-OXIDE ACTIVE MATERIAL

[76] Inventor: Rene Koksbang, 4231 Norwalk Dr., San Jose, Calif. 95129

[21] Appl. No.: 221,301

[22] Filed: Mar. 31, 1994

[51] Int. Cl.⁶ .......................... C01G 31/00; H01M 4/58; C01D 15/02
[52] U.S. Cl. ............................. 423/593; 429/218
[58] Field of Search ............................. 423/593; 429/218

[56] References Cited

U.S. PATENT DOCUMENTS

| | | | |
|---|---|---|---|
| 3,063,795 | 11/1962 | Smith | 23/51 |
| 3,063,796 | 11/1962 | Kelmers | 23/51 |
| 3,728,442 | 4/1973 | Pakhomov et al. | 423/593 |
| 4,061,711 | 12/1977 | Morgan et al. | 423/67 |
| 4,119,707 | 10/1978 | Thome et al. | 423/592 |
| 4,543,341 | 9/1985 | Barringer et al. | 423/593 |
| 4,636,248 | 1/1987 | Ogata et al. | 423/593 |
| 4,830,939 | 5/1989 | Lee et al. | 429/192 |
| 4,879,190 | 11/1989 | Lundsgaard | 429/94 |
| 4,918,035 | 4/1990 | Inoue et al. | 423/593 |
| 4,920,093 | 4/1990 | Nonaka et al. | 423/593 |
| 4,990,413 | 2/1991 | Lee et al. | 429/191 |
| 5,013,620 | 5/1991 | Miyazaki et al. | 429/194 |
| 5,023,071 | 6/1991 | Sherif | 423/593 |
| 5,037,712 | 8/1991 | Shackle et al. | 429/192 |
| 5,229,225 | 7/1993 | Shackle | 429/191 |
| 5,326,545 | 7/1994 | Koksbang et al. | 423/593 |
| 5,334,334 | 8/1994 | Koksbang | 423/593 |

FOREIGN PATENT DOCUMENTS

| | | | |
|---|---|---|---|
| 0397608 | 11/1990 | European Pat. Off. | |
| 62-143825 | 6/1987 | Japan | 423/593 |
| 63-112420 | 5/1988 | Japan | 423/593 |
| 2-233505 | 9/1990 | Japan | 423/593 |
| 3-170305 | 7/1991 | Japan | 423/593 |
| 94/23461 | 10/1994 | WIPO | |

*Primary Examiner*—Charles L. Bowers, Jr.
*Assistant Examiner*—J. Pasterczyk

[57] ABSTRACT

A method of making an electrode active material of the nominal general formula $LiV_yO_z$ where y is greater than 0 and up to about 3 and z is greater than 0 and up to about 8, comprises a series of steps. In the first step, lithium hydroxide is dispersed in an alcohol of the general formula $C_nH_{2n+1}OH$. The alcohol and the hydroxide are each in an amount sufficient to provide a lithium alkoxide of the general formula $LiOC_nH_{2n+1}$. Next, progressive amounts of an oxide of vanadium having the general formula $V_2O_5$ (vanadium pentoxide) are added while stirring the mixture. The amount of vanadium pentoxide in the mixture is sufficient to provide about 3 moles of vanadium for each mole of lithium present in the alkoxide. Then, the mixture is heated to an elevated temperature for a time sufficient to change the color of the oxide of vanadium and provide a solid precipitate. The solid precipitate is separated from the mixture and dried to obtain a powder of an oxide of vanadium having the nominal general formula $LiV_yO_z$, $0<y\leq3$ and $0<z\leq8$.

16 Claims, 1 Drawing Sheet

METHOD OF MAKING LITHIUM-VANADIUM-OXIDE ACTIVE MATERIAL

FIELD OF THE INVENTION

This invention relates to electrochemical batteries, and more particularly to improved positive electrode active material mainly composed of an oxide of vanadium.

BACKGROUND OF THE INVENTION

Lithium-based cells or batteries often comprise cathodes of transition metal oxides which are used as intercalation compounds. The intercalation reaction involves the interstitial introduction of a guest species, namely lithium, into the host lattice of the transition metal oxide, essentially without structural modification of the host lattice. Such an intercalation reaction is essentially reversible because suitable transition states are achieved for both the forward and reverse of the intercalation reaction.

The basic components of a lithium cell typically include a lithium anode, a separator, and a metal oxide intercalation cathode active material such as a vanadium oxide compound. The cathode is usually a mixture of such an oxide compound and other components such as graphite and an electrolyte/binder which provide ionic transport. During cell operation, incorporation of lithium in the metal oxide occurs.

Current batteries contain high surface area active material such as vanadium oxide and lithium vanadium oxide powders (i.e. $V_2O_5$, $LiV_2O_5$ and $LiV_3O_8$). These oxide powders are obtained, for example, by milling of vanadium oxide material. Current methods for the manufacture of powders involve mechanical grinding of vanadium oxide material prepared, for example, by rapid quench of molten material or by precipitation from an aqueous solution.

U.S. Pat. No. 5,013,620 describes solid state synthesis of $Li_{1+x}V_3O_8$ obtained by high temperature melting (at least 700° C.) of $V_2O_5$ with $Li_2CO_3$, in suitable proportions. The melt, once cooled, gives rise to solid lumps of material which are then difficult to crush and mill in order to obtain the cathode material. In addition, there is reaction between the molten $LiV_3O_8$ product and most containers which causes contamination of the product.

Formation of an oxide of vanadium in an aqueous solution of lithium hydroxide produces a gel product which is difficult to filter and dry. The dried product is in the form of lumps which are difficult to grind.

As can be seen, present processes produce vanadium oxide in the form of lumps. By standard milling techniques it is difficult to reduce the lumps to a size less than 100 micrometers (microns) and extremely difficult to achieve closer to 10 microns. Smaller vanadium oxide particle sizes are desirable because the larger the surface area, the higher is the current drawn from a battery while the current density on the surface of the vanadium oxide active material remains low which allows high utilization of the active material. A typical coarse $V_2O_5$ powder of 95% purity available from Fisher Scientific Company, has a median particle size of about 110 microns and a surface area of about 5 meters$^2$/gram. Such a powder would need extensive milling.

Therefore, what is needed is a new process of forming a vanadium oxide based active material which does not produce lumps and which is readily adaptable to large scale production.

SUMMARY OF THE INVENTION

In accordance with the invention, a method of making an electrode active material of the nominal general formula $LiV_yO_z$ where y is greater than 0 and up to about 3 and z is greater than 0 and up to about 8, comprises a series of steps. In the first step, lithium hydroxide is dispersed in an alcohol of the general formula $C_nH_{2n+1}OH$. The alcohol and the hydroxide are each in an amount sufficient to provide a lithium alkoxide of the general formula $LiOC_nH_{2n+1}$. Next, progressive amounts of an oxide of vanadium having the general formula $V_2O_5$ (vanadium pentoxide) are added while stirring the mixture. The amount of vanadium pentoxide in the mixture is sufficient to provide about 3 moles of vanadium for each mole of lithium present in the alkoxide. Then, the mixture is heated to an elevated temperature for a time sufficient to change the color of the oxide of vanadium and provide a solid precipitate. The solid precipitate is separated from the mixture and dried to obtain a powder of an oxide of vanadium having the nominal general formula $LiV_yO_z$, $0<y\leq3$ and $0<z\leq8$. It should be noted that the value of z may slightly exceed 8 and be on the order of 8.1 but it is less than 9; and the value of y may exceed 3 but it is less than 4. Accordingly, the nominal formula remains as above.

It is preferred that the mixture contains a stoichiometric amount of the alkoxide and pentoxide. This corresponds to about 2 moles of the alkoxide for each 3 moles of vanadium pentoxide. The stoichiometric mixture is heated to elevated temperature in a range of about 70° to about 80° centigrade, for about one to about three hours. The progress of the reaction $LiOCH_nCH_{2n+1}+V_2O_5 \rightarrow LiV_yO_x$ is monitored by observing a color change from yellow/red to brown/black.

Finally, the precipitate is separated from the mixture and is dried at a temperature of about 110° centigrade. A higher temperature, such as 150° C. may be used but it is not necessary.

Alcohols which are suitable for forming the lithium alkoxide include methanol, ethanol, propanol, butanol, isopropanol, and higher alcohols. The higher alcohols are likely to react more slowly with the lithium. Ethanol is preferred. When ethanol is used, the lithium hydroxide and ethanol provide a lithium alkoxide of the general formula $LiOCH_2CH_3$ (lithium oxylate or lithium ethoxylate) according to the reaction $LiOH+CH_3CH_2OH \rightarrow LiOCH_2CH_3+H_2O$. Vanadium pentoxide is added to the lithium alkoxide in an amount to provide about 3 moles of vanadium for each mole of lithium. Next, the mixture is heated to the elevated temperature for a time sufficient to react the vanadium pentoxide with the $LiOCH_2CH_3$ until a color change demonstrates the desired product (precipitate) has been formed. The color change is the same as described above. All other steps of the process are according to the general method described earlier. In one embodiment, the ethanol is present in a solution of 96% ethanol; about 0.5 mole of lithium hydroxide is used for each 200 milliliters of 96% ethanol; and about 0.75 mole of vanadium pentoxide is used for each 0.5 mole of lithium hydroxide.

The $LiV_yO_z$ product of the invention is in the form of a fine powder having a surprisingly small particle size on the order of 0.1 to 5 microns, and typically less than 10 microns.

The cathode material of the invention was tested in a cell to determine the behavior of specific capacity at an increasing number of charge and discharge cycles.

The rate capability and cycling capacity was markedly improved over lithium vanadium oxide prepared by conventional methods.

It is an object of the invention to provide a new method for preparing a lithium vanadium oxide positive electrode active material for a lithium battery. Another object is to provide a lithium battery having good charge and discharge capacity. Another object is to provide an improved electrochemical battery based on lithium which maintains its integrity over prolonged life cycle as compared to presently used batteries. Another object is to provide good conversion of the starting materials to the lithium vanadium oxide product.

These and other objects, features and advantages will become apparent from the following description of the preferred embodiments, claims and accompanying drawings.

DETAILED DESCRIPTION OF THE PREFERRED EMBODIMENTS

I. Preparation of Active Material

Figure 1:
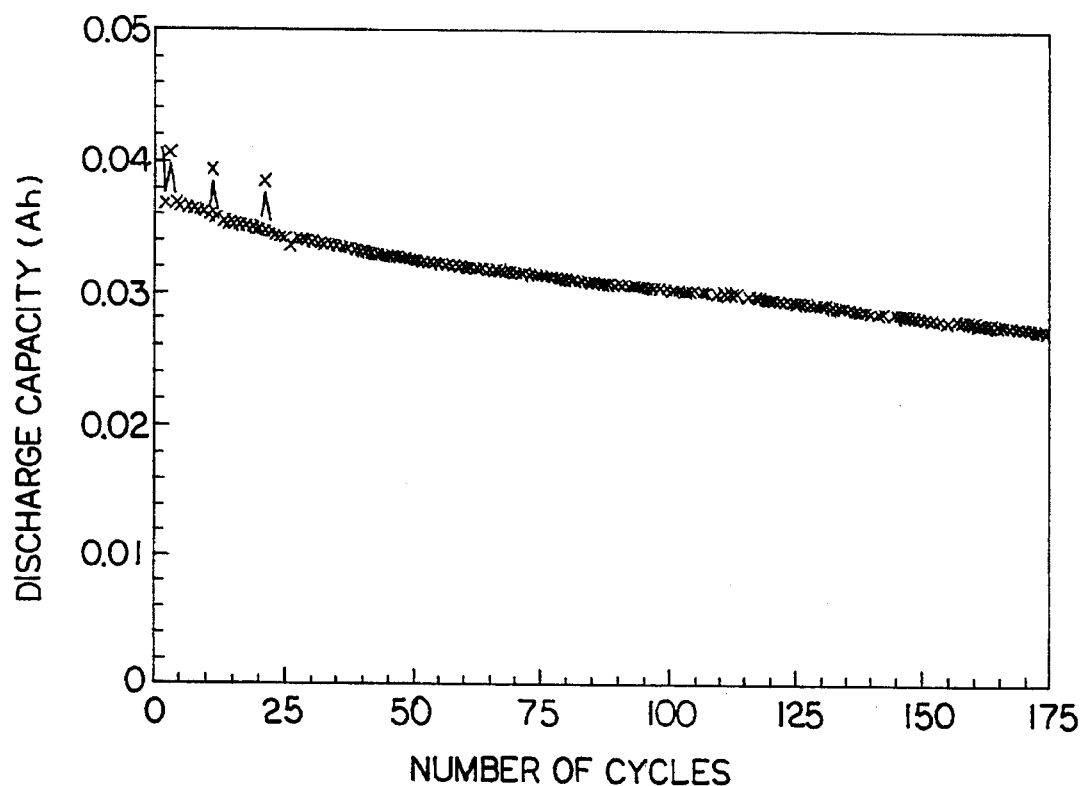
FIG. 1 shows the behavior of the specific capacity at an increasing number of charge and discharge cycles.

In one embodiment a positive electrode material of the nominal general formula $LiV_yO_z$ is prepared by a series of steps beginning with forming a mixture of lithium hydroxide dispersed in an alcohol of the general formula $C_nH_{2n+1}OH$. This produces a lithium alkoxide of the general formula $LiOC_nH_{2n+1}$ according to the following general reaction: $LiOH+C_nH_{2n+1}OH \rightarrow LiOC_nH_{2n+1}+H_2O$.

The above reaction may be conducted under room temperature conditions, at a temperature in a range of about 15° to about 95° centigrade, and preferably 70° to 85° C. In accordance with the general formula shown above, one mole of the lithium hydroxide is reacted with one mole of an alcohol to form one mole of the lithium alkoxide product. Alcohols which are suitable for forming the lithium alkoxide include methanol, ethanol, propanol, butanol, isopropanol, and high alcohols. The higher alcohols are likely to react more slowly with the lithium. Ethanol is preferred. In the case of ethanol, the reaction to form the lithium alkoxide (lithium oxalate or lithium ethoxylate) is according to: $LiOH+CH_3CH_2OH \rightarrow LiOCH_2CH_3+H_2O$.

The reaction proceeds rather quickly in about a few minutes. Once the lithium alkoxide is formed, to the mixture is added progressive amounts of an oxide of vanadium, having the general formula $V_2O_5$ (vanadium pentoxide). The vanadium pentoxide is added progressively while stirring the mixture so as to provide about three moles of vanadium in the final product for each mole of lithium. This corresponds to a stoichiometric molar ratio of lithium alkoxide to vanadium pentoxide of about 2 to 3. This mixture is heated to a temperature higher than room temperature and preferably in a range of about 70 to about 80 degrees centigrade. Heating is conducted for at least about one half hour and preferably for about one to three hours. In order to react the lithium alkoxide with the vanadium pentoxide according to the following general formulas:

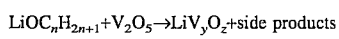

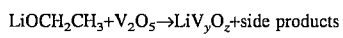

The progress of the reaction may be followed by observing a change in color whereby the vanadium pentoxide is transformed to a lithium-vanadium oxide product and changes from a yellow-red to a brown-black. The reaction product is the brown to black solid precipitate which is separated and dried to obtain a fine powder of an oxide of the lithium-Vanadium oxide having the nominal general formula $LiV_yO_z$ where y is greater than 0 and less than or equal to about 3 and z is greater than 0 and less than or equal to about 8. The drying may occur at a temperature in a range of about 20° to about 300° centigrade. It is preferred that the drying temperature be 110° centigrade. Higher temperatures are not strictly necessary but may be more efficient.

Example

The method of the invention was demonstrated by using lithium hydroxide, 96% ethanol, and vanadium pentoxide powder ($V_2O_5$).

Vanadium pentoxide of the general formula $V_2O_5$ was obtained from Kerr McGee, Johnson Matthey or Alpha Products of Danvers, Mass. It had a melting point of 690° C., decomposed at 1750° C. and had a specific gravity of 3,357 grams per cc at 18° C. It was a yellow to red crystalline powder. Vanadium pentoxide has a CAS number of 1314-62-1.

Alternatively, the vanadium pentoxide may be prepared from ammonium metavanadate ($NH_4VO_3$). The ammonium metavanadate is heated to a temperature of about 400° C. to about 450° C. to decompose it to vanadium pentoxide ($V_2O_5$), usually in a crystalline form (in the presence of oxygen). The ammonium metavanadate is a solid crystalline material, usually a white to yellow powder. Processes for production of ammonium metavanadate are known in the art and will not be repeated here. Such processes are described in U.S. Pat. Nos. 3,063,795 and 3,063,796; and processes for preparation of ammonium metavanadate and then for production of vanadium pentoxide therefrom are described in U.S. Pat. Nos. 3,728,442, 4,061,711 and 4,119,707, each of which is incorporated by reference in its entirety.

Lithium hydroxide is a powder of essentially colorless crystals having a specific gravity of approximately 2.54 and a melting point of approximately 462° centigrade. In this example, approximately 12 grams of lithium hydroxide was dispersed in about 200 milliliters of 96% ethanol. The 12 grams of lithium hydroxide corresponds to approximately 0.5 mole.

The lithium hydroxide was dissolved in the alcohol to provide the lithium alkoxide. Next, progressive amounts of vanadium pentoxide were added to the mixture containing the lithium alkoxide while keeping the whole mixture stirred. In this example, approximately 136.5 grams of vanadium pentoxide was used which corresponds to about 0.75 mole.

The mixture was then heated to a temperature in a range of approximately 70° to 80° centigrade for about one to three hours. The progress of the reaction was monitored by a color change from the typical yellow/red $V_2O_5$ color to a darker color which was reddish-brown to brown-black. Since monitoring of a color change may be somewhat subjective, it is sufficient to follow the color change, typically from relatively light to a relatively darker color. The color changes are dependent on several factors including the reaction chemistry, particle size, particle morphology, and impurities. Other color changes may be observed besides those described above. The product after filtering and drying, however, will typically appear as a brown-black color. The solid precipitate product of the invention was filtered and dried producing a fine powder of the above-mentioned brown-black color. The product was found to have a surprisingly small particle size on the order of 0.1 to 5 microns, and typically less than 10 microns.

The vanadium pentoxide is typically at least partially dissolved in the mixture. Typically, some portion of the vanadium pentoxide is dissolved and some is dispersed in the mixture. It is usually not necessary to use excess amounts of the alkoxide or the pentoxide to drive the reaction to completion. Close to stoichiometric amounts are sufficient and prevent unnecessary waste. It may become necessary in some situations to use an excess amount of the alcohol in order to keep the mixture from becoming solid before the reactions are complete. For example, a two to one ratio of alcohol to lithium hydroxide prevents the formation of a solid lump of $CH_3CH_2OLi$. Alternatively, it is possible to use a relatively low concentration of alcohol in water solution, i.e., 50% ethanol rather than 96% ethanol to achieve the same purpose. It is preferred to conduct the drying step in an essentially oxygen-free atmosphere such as under an inert gas, argon, helium, nitrogen, or under a vacuum or subatmospheric pressure. Although it is not thought to be necessary, it is possible to also conduct the reaction step in a similar atmosphere. It is preferred to use linear alcohols in the process, however, branched alcohols may also be used. The lower the alcohol and the less is the branching, the faster the reaction rate one expects. Ethanol is the first choice, With methanol being the second choice.

II. Preparation of Cell Using Active Material

Figure 2:
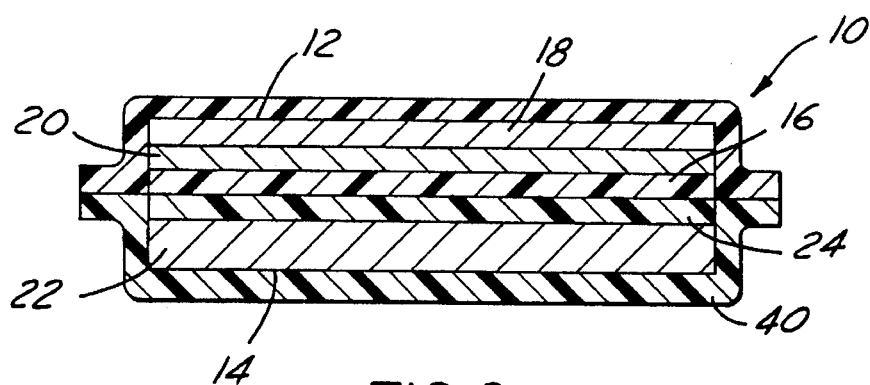
FIG. 2 is an illustration of a cross-section of a thin battery, or cell embodying the invention.

The cathode active material of the invention is used to prepare cathodes for lithium based electrochemical cells. The cycling performance of the active material (FIG. 1) was obtained using a cell as shown in FIG. 2. The test cell used to determine capacity had an active area of about 28 cm². Referring to FIG. 2, an electrochemical cell or battery 10 has a negative electrode side 12, a positive electrode side 14, and a separator 16 there-between. In accordance with common usage, a battery may consist of one cell or multiple cells. The negative electrode is the anode during discharge, and the positive electrode is the cathode during discharge. The negative electrode side includes current collector 18, typically of nickel, iron, stainless steel, and/or copper foil, and a body of negative electrode material 20. The negative electrode material 20 is sometimes simply referred to as the negative electrode or negative electrode composition. The negative electrode side 12 may consist of only a metallic electrode 20 without a separately distinguishable current collector 18. The positive electrode side 14 includes current collector 22, typically of aluminum, nickel, iron, stainless steel, and/or copper foil, or such foils having a protective conducting coating foil, and a body of positive electrode material 24. The cathode composition 24 has a typical composition as set forth in Table 1 and includes the $LiV_yO_z$ of the invention as the active material. The positive electrode material 24 is sometimes simply referred to as the positive electrode or positive electrode composition. The separator 16 is typically a solid electrolyte or electrolyte separator. Suitable electrolyte separators (polymer electrolyte) are described in U.S. Pat. Nos. 4,830,939, 4,990,413, 5,037,712, and 5,229,225 each of which is incorporated herein by reference in its entirety. The electrolyte separator is a solid organic polymer matrix containing an ionically conducting powder or liquid with an alkali metal salt and the liquid is an aprotic polar solvent. Cell 10 also includes a protective covering (not shown) which functions to prevent water and air from contacting the reactive layers of the cell 10.

Cell 10 is preferably a laminar thin cell type including a lithium anode (negative electrode 20). Laminar thin-cell batteries containing lithium anodes are known in the art, and it will be appreciated that the cell can include various constructions such as bi-faced or bi-polar cell designs. Examples of cell constructions include a "jelly roll" or a fan folded laminate strip design as described in U.S. Pat. No. 4,879,190 incorporated herein by reference in its entirety.

Because the cell utilizes a lithium anode layer 20, it is necessary to manufacture the cell in a water (humidity) free environment. Lithium is extremely reactive with water and if reacted, a passivation layer can form on the surface of the anode layer, reducing the efficiency of the layer, and increasing cell impedance. Accordingly, it is particularly desirable to manufacture the cell in an environment having a relative humidity at room temperature of less than 2% (less than 300 ppm water). An environment containing between 1 ppm and 50 ppm water, and preferably less than 1 or 2 ppm water, produces a particularly efficient cell.

TABLE 1

| TYPICAL CATHODE COMPOSITION | PERCENT WEIGHT |
|---|---|
| Active Material $LiV_yO_z$ | 45.0 |
| Carbon | 10.0 |
| Propylene Carbonate (PC) | 33.0 |
| PolyEthylene Oxide (PEO) | 1.0 |
| PolyEthyleneGlycolDiAcrylate (PEGDA) | 9.0 |
| TriMethylPolyEthylene Oxide Tri-Acrylate (TMPEOTA) | 2.0 |

The cathode composition containing the active material of the invention is coated onto nickel foil, followed by electron beam curing (cross-linking/polymerization) of the acrylate component. Then the electrolyte is coated on top of the cathode and cured with ultraviolet light. The lithium electrode is applied on top of the electrolyte separator and the battery is finally placed in a flexible pouch 40 which is heat sealed under vacuum.

The cathode material of the invention was tested in a cell to determine the behavior of specific capacity at an increasing number of charge and discharge cycles.

The rate capability and cycling capacity was markedly improved over lithium vanadium oxide prepared by conventional methods. The improved behavior of the specific capacity at an increasing number of charge and discharge cycles is as shown in FIG. 1.

Although not wishing to be held to any particular theory, it is thought that the product of the invention is in the form of $LiV_2O_5$ with perhaps a small amount of $LiV_3O_8$. Hence, the product $LiV_yO_z$, $0<y\leq3$ and $0<z\leq8$ encompasses both the $LiV_2O_5$ and $LiV_3O_8$. The product of the invention is preferred compared to other lithium vanadium oxide particles because of the small particle size. In an as-synthesized condition the product is a powder with particle size on the order of 10 microns or less and is easily crushed to a smaller size during the formation of the cathode mixture. The fineness of the particles is important to good performance of the cathode itself because many advantages are obtained. They include no breaking of large particles which typically occurs during intercalation/disintercalation cycles; no contact loss occurs; better contact between the active material and the conductive material (carbon) so it is possible to apply high current; and the electrolyte can reach into innermost portions of the cathode to reduce polarization. Such advantages are evidenced by the cycling performance shown in FIG. 1.

The invention provides a lithium vanadium oxide compound having high purity, and good energy, power and cycling capability. The process of the invention is efficient and readily adaptable to continuous production of large quantities of active material in a manufacturing setting.

While this invention has been described in terms of certain embodiments thereof, it is not intended that it be limited to the above description, but rather only to the extent set forth in the following claims.

The embodiments of the invention in which an exclusive property or privilege is claimed are defined in the appended claims.

We claim:

1. A method of making an electrode active material of the nominal general formula $LiV_yO_z$ where y is greater than 0 but less than or equal to 3, and z is greater than 0 but less than or equal to 8, comprising:
   a. forming a mixture of lithium hydroxide dispersed in a alcohol of the general formula $C_nH_{2n+1}OH$, each of said lithium hydroxide and said alcohol being provided in an amount sufficient to provide a lithium alkoxide of the general formula $LiOC_nH_{2n+1}$;
   b. adding to the mixture of step (a) progressive amounts of an oxide of vanadium having the general formula $V_2O_5$ (vanadium pentoxide) while stirring the mixture;
   c. reacting the vanadium oxide with the alkoxide in the mixture of step (b) for a time sufficient to provide a solid precipitate of the general formula $LiV_yO_z$; and
   d. separating and drying the solid precipitate of step (c) to obtain a powder of an oxide of vanadium having the nominal general formula $LiV_yO_z$, where $0<y\leq3$ and $0<y\leq8$.

2. The method according to claim 1 wherein the mixture of step (b) includes 2 moles of the alkoxide for each 3 moles of vanadium pentoxide.

3. The method according to claim 1 wherein the reacting step (c) is monitored by observing color change as the precipitate is formed.

4. The method according to claim 1 wherein the reaction temperature of step (c) is in a range of 70° to 85° centigrade.

5. The method according to claim 4 wherein the reaction temperature of step (c) is maintained for one half to three hours.

6. The method according to claim 1 wherein the drying step is conducted at a temperature of 110° to 150° centigrade.

7. The method according to claim 1 wherein the alcohol is selected from the group consisting of methanol and ethanol.

8. A method of making an electrode active material of the general formula $LiV_yO_z$, where y is greater than 0 but less than or equal to 3, and z is greater than 0 but less than or equal to 8, comprising:
   a. forming a mixture of lithium hydroxide dispersed in ethanol each in an amount sufficient to provide a lithium alkoxide of the general formula $LiOCH_2CH_3$ according to the reaction

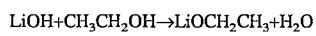

$$LiOH + CH_3CH_2OH \rightarrow LiOCH_2CH_3 + H_2O$$

b. adding to the mixture of step (a) progressive amounts of an oxide of vanadium having the general formula $V_2O_5$ (vanadium pentoxide) while stirring the mixture;
   c. reacting the oxide of vanadium with the $LiOCH_2CH_3$ in the mixture of step (b) for a time sufficient to provide a solid precipitate of the general formula $LiV_yO_z$; and
   d. separating and drying the solid precipitate of step (c) to obtain a powder of an oxide of vanadium having the nominal general formula $LiV_yO_z$, where $0<y\leq3$ and $0<z\leq8$.

9. The method according to claim 8 wherein the ethanol is present in a solution of at least 50% ethanol.

10. The method according to claim 8 wherein 96% ethanol is used and 0.5 moles of lithium hydroxide are used for each 200 milliliters of 96% ethanol.

11. The method according to claim 8 wherein 0.75 moles of vanadium pentoxide are used in step (b) for each 0.5 moles of lithium hydroxide used in step (a).

12. The method according to claim 8 wherein the mixture of step (b) includes 2 moles of the alkoxide of step (a) for each 3 moles of vanadium pentoxide.

13. The method according to claim 8 wherein reacting step (c) is monitored by observing color change as the precipitate is formed.

14. The method according to claim 8 wherein the reaction temperature of step (c) is in a range of about 70° to 85° centigrade.

15. The method according to claim 14 wherein the reaction temperature of step (c) is maintained for one half to three hours.

16. The method according to claim 8 wherein the drying step is conducted at a temperature of about 110° centigrade.

* * * * *